(12) United States Patent
Berntsen et al.

(10) Patent No.: US 8,865,356 B2
(45) Date of Patent: Oct. 21, 2014

(54) ELECTRICAL GENERATION SYSTEM AND METHOD FOR A HYBRID FUEL CELL POWER PLANT

(75) Inventors: George Berntsen, Shelton, CT (US); Hossein Ghezel-Ayagh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 231 days.

(21) Appl. No.: 13/348,337

(22) Filed: Jan. 11, 2012

(65) Prior Publication Data

US 2013/0175805 A1 Jul. 11, 2013

(51) Int. Cl.
*H01M 8/00* (2006.01)

(52) U.S. Cl.
USPC .......................................... 429/400

(58) Field of Classification Search
None
See application file for complete search history.

(56) References Cited

U.S. PATENT DOCUMENTS

| | | | |
|---|---|---|---|
| 5,573,867 A * | 11/1996 | Zafred et al. ................... 429/410 |
| 5,719,458 A * | 2/1998 | Kawai ...................... 310/156.49 |
| 6,365,290 B1 * | 4/2002 | Ghezel-Ayagh et al. ..... 429/423 |
| 7,862,938 B2 | 1/2011 | Ghezel-Ayagh |
| 2005/0058863 A1 * | 3/2005 | Wang et al. ..................... 429/26 |
| 2005/0079395 A1 * | 4/2005 | Varatharajan et al. .......... 429/22 |
| 2005/0106429 A1 * | 5/2005 | Keefer ............................ 429/20 |
| 2006/0010872 A1 * | 1/2006 | Singh et al. ..................... 60/671 |
| 2006/0222919 A1 * | 10/2006 | Tanaka et al. ................... 429/26 |
| 2008/0187789 A1 * | 8/2008 | Ghezel-Ayagh ............... 429/13 |
| 2010/0090553 A1 * | 4/2010 | Ritchey ........................ 310/114 |
| 2012/0094555 A1 * | 4/2012 | Calverley et al. ................ 440/6 |

OTHER PUBLICATIONS

International Search Report of International Application No. PCT/US2013/020626 issued on Jun. 14, 2013.

* cited by examiner

*Primary Examiner* — Patrick Ryan
*Assistant Examiner* — Jose Colucci Rios
(74) *Attorney, Agent, or Firm* — Cowan, Liebowitz & Latman, P.C.

(57) ABSTRACT

A hybrid fuel cell system comprising a high temperature fuel cell having an anode section and a cathode section, a gas turbine comprising a compressor cycle for compressing a supply gas and an expansion cycle for expanding one of heated compressed supply gas and a second gas derived from the compressed supply gas to provide mechanical energy to an induction machine, and an induction machine for converting mechanical energy to electrical energy and adapted to output an electrical output.

27 Claims, 4 Drawing Sheets

ELECTRICAL GENERATION SYSTEM AND METHOD FOR A HYBRID FUEL CELL POWER PLANT

BACKGROUND OF THE INVENTION

This invention relates to hybrid fuel cell and turbine generator systems, and in particular, to electrical generation for hybrid fuel cell power plants.

A fuel cell is a device that directly converts chemical energy in the form of a fuel into electrical energy by way of an electrochemical reaction. In general, like a battery, a fuel cell includes a negative electrode or anode and a positive electrode or cathode separated by an electrolyte that serves to conduct electrically charged ions between them. In contrast to a battery, however, a fuel cell will continue to produce electric power as long as fuel and oxidant are supplied to the anode and cathode, respectively. In order to produce a useful amount of power, individual fuel cells are typically arranged in stacked relationship in series.

A fuel cell may be combined with a heat engine such as a turbine generator to produce a high efficiency system, commonly called a hybrid system. In a conventional hybrid system, a fuel cell is typically situated in the position normally occupied by the combustor of the turbine generator so that air compressed by the turbine generator compressor section is heated and then sent to the fuel cell cathode section. In another hybrid system, a heat engine in the form of a turbine generator is bottomed with a fuel cell so that the heated air discharged from the gas turbine is delivered to the cathode section of the fuel cell. For example, U.S. Pat. No. 6,365,290, assigned to the same assignee herein, discloses such a hybrid fuel cell/gas turbine system, in which waste heat from the fuel cell is used by a heat recovery unit to operate the heat engine cycle, and the system is arranged such that the compressed oxidant gas, heated in the heat recovery unit and by a high temperature heat exchanger, is expanded in the expansion cycle of the heat engine. It is then passed through an oxidizer (also commonly called combustor or burner), which also receives the anode exhaust, passed through the heat exchanger and the resultant gas delivered to the cathode section of the fuel cell.

Despite the efficiency benefits provided by current hybrid fuel cell systems, such as those described above, these systems have had certain limitations. Specifically, the size and power output of the turbine generator has to be matched to the size and power output of the fuel cell power plant and the turbine generator has to be synchronized to the electric power grid. For example, in a sub-MW hybrid fuel cell plant, a 60 KW microturbine is suitable for use as the turbine generator. Such hybrid system uses an inverter-based power conditioner to rectify the high frequency output of the microturbine generator and to provide a 60 Hz output so as to synchronize the microturbine to the electric power grid. However, for MW-scale power plants, microturbines are usually not available in the required size range. For example, 1.8 MW DFC/T® and 3.6 MW DFC/T® power plant, both based on Molten Carbonate Fuel Cell (MCFC) stacks manufactured by the assignee herein, require turbine-generators rated at about 325 KW and 650 KW, respectively. Since microturbine generators are not available in this range, a larger synchronous generator and a commercially available, regenerative variable frequency drive have to be used in the MW-scale hybrid power plants.

There are a number of disadvantages of using such generators in the hybrid power plants, including high costs, losses in efficiency, larger footprint, requiring an additional area for the variable frequency drive enclosure, increased complexity and decreased reliability. Moreover, when the hybrid power plant uses a synchronous generator, direct connection of the synchronous generator to an electric power grid is not feasible. This is because a synchronous generator utilizes an unfired gas turbine, the mechanical power of which is determined by the fuel cell waste heat, and control of such unfired turbines requires additional complexities in the turbine design, resulting in increased cost, lower efficiencies and decreased reliability.

SUMMARY OF THE INVENTION

The present invention provides a hybrid fuel cell power plant, which may be a MW-scale hybrid power plant, the construction and control of which is simple and reliable. The present invention also provides a hybrid fuel cell power plant which can be easily connected to an electric power grid and which does not require additional complexities in the turbine design.

These advantages are realized in a hybrid fuel cell system comprising a high temperature fuel cell power plant having an anode section and a cathode section, a gas turbine comprising a compressor cycle for compressing a supply gas and an expansion cycle for expanding one of heated compressed supply gas and a second gas derived from the compressed supply gas to provide mechanical energy to an induction machine, and an induction machine for converting mechanical energy to electrical energy and adapted to output an electrical output. The induction machine is adapted to be connected to an electric power grid without using synchronization equipment or speed controls for the turbine. In some embodiments, the gas turbine is an unfired gas turbine and the supply gas is at least one of air and oxidant gas. The induction machine may be a three-phase 4-pole induction machine having a predetermined size to match the gas turbine. In some embodiments, the high temperature fuel cell power plant is a Mega-Watt (MW) scale fuel cell power plant and the predetermined size of the induction machine is at least 300 kW. For example, the high temperature fuel cell power plant may comprise a 1.4 MW fuel cell power plant and the predetermined size of the induction machine is 325 kW, or the high temperature fuel cell power plant may comprise a 2.8 MW fuel cell power plant and the predetermined size of the induction machine is 650 kW.

The induction machine operates as an induction motor or as an induction generator, and during a heat-up operation of the high temperature fuel cell power plant, the induction machine operates as an induction motor drawing power from a power source or being driven by the waste heat of the high temperature fuel cell power plant, while during normal operation of the high temperature fuel cell power plant, the induction machine operates as an induction generator and outputs electric power. In some embodiments, the system includes balance of plant components and the induction machine provides electrical power output to the balance of plant components when operating as an induction generator. In some embodiments, the induction machine is able to connect to an electrical grid, without the use of speed controls or synchronization equipment, and the system further includes a generator output breaker for connecting and disconnecting the induction machine to and from the electrical grid and a controller for controlling opening and closing of the generator output breaker based on at least one of a speed of a rotor of the induction machine and an amount of heat produced by the high temperature fuel cell power plant. During the heat-up operation of the high temperature fuel cell power plant, the controller controls the generator output breaker to close if the high temperature fuel cell power plant produces a predetermined amount of waste heat and the speed of the rotor is less than a first predetermined speed, the controller controls the generator output breaker to open if the high temperature fuel cell power plant produces at least the predetermined amount of waste heat and the speed of the rotor is greater than or equal to the first predetermined speed and less than a second predetermined speed, and the controller controls the generator output breaker to close if the speed of the rotor is greater than the second predetermined speed. In such embodiments, the predetermined amount of waste heat is the amount of heat sufficient for operating the gas turbine, the first predetermined speed is 50% of a grid synchronous operating speed of the induction machine and the second predetermined speed is 95% of the grid synchronous operating speed of the induction machine.

In some embodiments, the high temperature fuel cell power plant is adapted to connect to an electrical grid and the induction machine is adapted to connect to the electrical grid, and the system includes at least one transformer for connecting the high temperature fuel cell power plant and the induction machine to the electrical grid. The transformer may be a three-phase transformer and in some embodiments, the system also includes a breaker for connecting and disconnecting the transformer to and from the electrical grid and a controller for controlling the opening and closing of the breaker based on one or more predetermined conditions of the system.

In certain embodiments, the compressor cycle of the gas turbine compresses the supply gas which comprises one or more of oxidant gas and air and outputs compressed supply gas, at least one heat recovery unit recovers heat from at least one of cathode exhaust and anode exhaust and heats the compressed supply gas and the expansion cycle expands the heated compressed supply gas and provides mechanical energy to the induction machine. In such embodiments, the system may also include an oxidizer adapted to receive anode exhaust and expanded supply gas and to catalytically oxidize the anode exhaust so as to output heated oxidant gas, and the compressed supply gas is heated using cathode exhaust in the heat recovery unit and thereafter further heated using the heated oxidant gas output from the oxidizer.

In other embodiments, as described in U.S. Pat. No. 7,862,938, assigned to the same assignee herein the compressor cycle of the gas turbine compresses the supply gas comprising one or more of oxidant gas and air and outputs compressed supply gas to an oxidizer which is also adapted to receive anode exhaust from the high temperature fuel cell and to catalytically oxidize the anode exhaust and output the second gas comprising heated compressed oxidant gas, and the expansion cycle expands the second gas and provides mechanical energy to the induction machine and expanded oxidant gas to the cathode section of the high temperature fuel cell. In such embodiments, the system also includes at least one heat recovery unit for recovering heat from at least one of cathode exhaust and anode exhaust and for further heating the second gas prior to expanding the second gas in the expansion cycle.

A method of generating electrical power output using a hybrid fuel cell system with any of the above features is also described.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
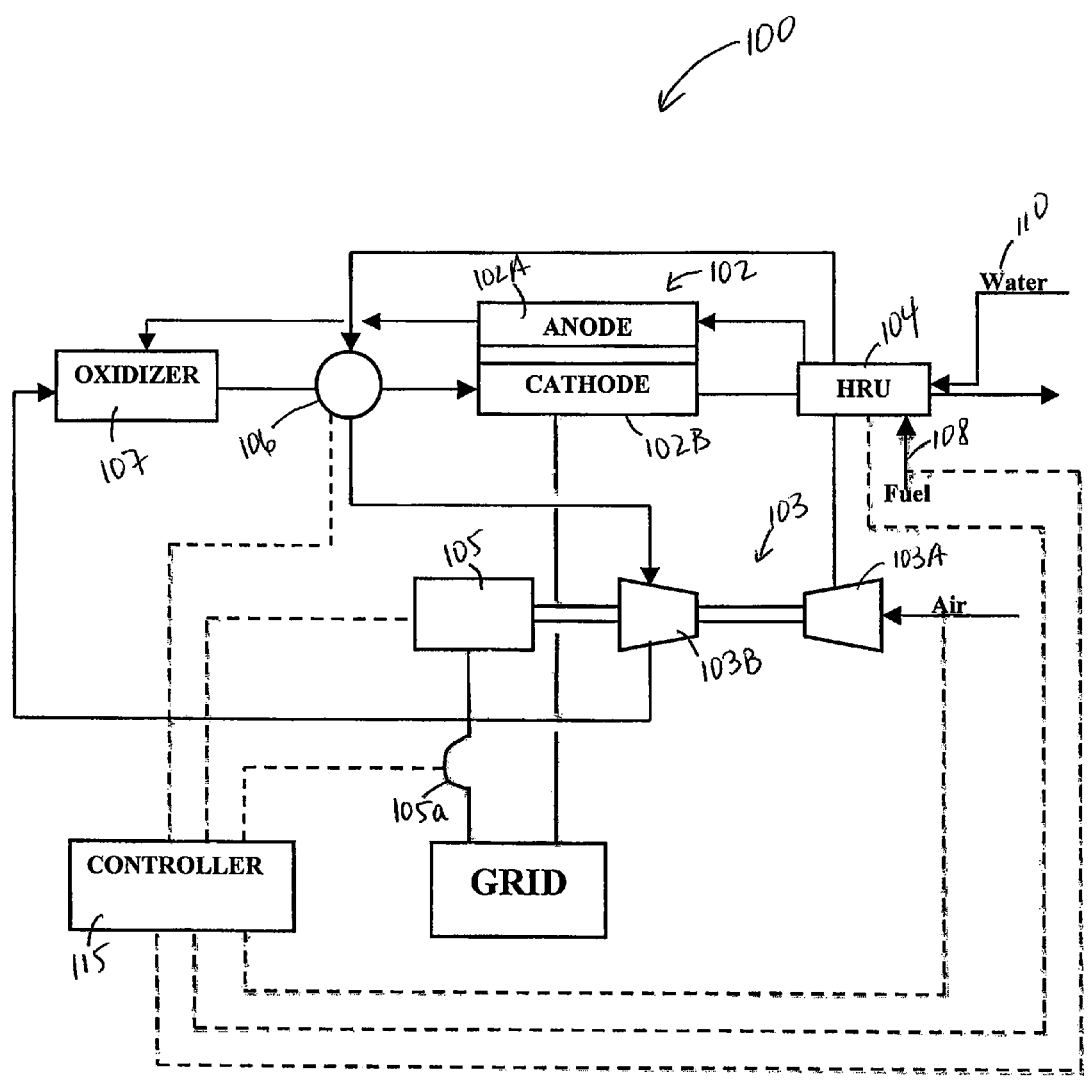
FIG. 1 shows a hybrid fuel cell power plant system in accordance with the present invention.

FIG. 1 shows a hybrid fuel cell power plant system 100 of the present invention. The system 100 includes a high temperature fuel cell power plant 102, such as a molten carbonate fuel cell power plant and/or a solid oxide fuel cell power plant. The fuel cell power plant 102 includes one or more fuel cell stacks, and each fuel cell stack comprises multiple fuel cells with each fuel cell having an anode section, a cathode section and an electrolyte matrix. FIG. 1 schematically shows the anode section 102A and the cathode section 102B of the fuel cell power plant 102. In some embodiments, the fuel cells are molten carbonate fuel cells with direct and/or indirect internal reforming and/or with external reforming. In other embodiments, the fuel cells are internally or externally reforming solid oxide fuel cells.

In the present illustrative embodiment, the fuel cell power plant 102 is a MW-scale molten carbonate fuel cell power plant. For example, the fuel cell power plant may be a 2.8 MW fuel cell power plant, such as a DFC3000® power plant, or a 1.4 MW fuel cell power plant, such as a DFC1500® power plant. However, other types of fuel cell power plants and other sizes of fuel-cell power plants, such as larger or smaller, e.g., sub-MW power plants, may be used in the present invention.

The hybrid system 100 also includes a gas turbine 103, or a heat engine, having a gas compressor section 103A for carrying out a gas compression cycle and an expansion section 103B for carrying out a gas expansion cycle. In the present illustrative embodiment, the gas turbine is an unfired gas turbine. However, other types of gas turbines or heat engines may be suitable for use in the hybrid system. Examples include Internal Combustion Engines (ICE), such as a spark-ignited reciprocating engine, and External Combustion Engines, such as Stirling engines. The expansion section 103B of the gas turbine is coupled with a generator 105 which generates an electrical output from the expansion process in the expansion section by converting mechanical energy provided from the expansion section to electrical energy. According to the present invention, the generator 105 is an induction machine sized to match the unfired gas turbine 103 and the fuel cell power plant. For example, in a hybrid system that uses the DFC3000® fuel cell power plant, a 650 KW induction generator may be used, while in a hybrid system that uses the DFC1500® fuel cell power plant, a 325 KW induction generator may be used.

The induction machine 105 is physically identical or substantially similar to an induction motor, and has electrical connections (typically, 3 electrical connections) to a stator of the machine 105 for inducing rotor excitation. As a motor, the induction machine operates slightly below the synchronous speed at a slip speed typically 2-3% of its rated synchronous speed. For example, a three-phase, 4-pole induction machine connected to a 60 Hz power supply or grid has a rated synchronous speed of 1800 rpm. However, when the induction machine 105 operates as the induction generator, the turbine expansion section 103B pushes the rotor of the induction machine to a speed from the typical motoring region slip speed to the synchronous speed point at a slip of zero and then to a rotation speed above the synchronous speed for the induction machine.

Figure 3:
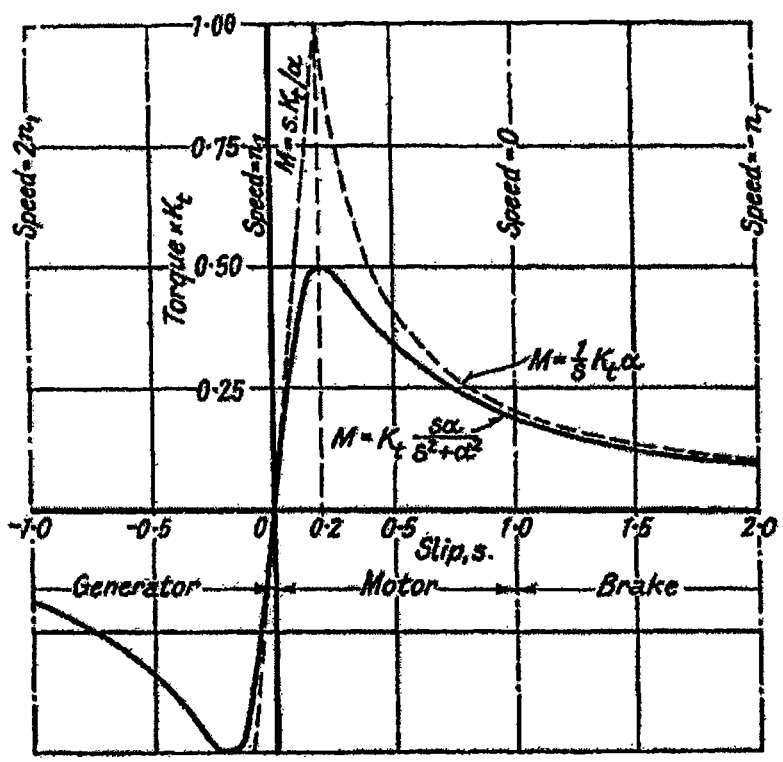
FIG. 3 shows a graph of a transition between a motor function of the induction machine to a generator function of the induction machine.

The transition between the motor function of the induction machine 105 to the generator function of the induction machine 105 is shown in the graph of FIG. 3. In FIG. 3, the X-axis represent the slip and speed of the induction machine, with the slip increasing from left to right and the speed increasing from right to left, as the slip decreases. The Y-axis in FIG. 3 represent the torque of the induction machine 105. As shown in FIG. 3, when the induction machine operates as a generator, the slip becomes slightly negative because the rotor speed is higher than the synchronous frequency rotation speed of the electric grid with which the induction machine is connected. Thus, when the induction machine 105 operates as the induction generator, the stator ceases to draw real current from the grid, and instead, provides an electrical current from the stator's windings to the grid. As more mechanical power is applied to the turbine, more electrical power is generated by the induction machine at the grid frequency. As also shown in FIG. 3, when the induction machine operates as a generator, the torque is negative. In contrast, when the induction machine operates as a motor, the torque and the slip are positive, and the induction motor draws current from the grid to rotate the rotor and/or is powered by waste heat generated by the fuel cell power plant.

Referring now back to FIG. 1, the system 100 includes a heat recovery unit 104, which receives fuel and water from respective fuel and water supplies 108, 110 and heated exhaust gas from the cathode section 102B of the fuel cell power plant. The heated cathode exhaust is about 1150-1200 degrees F. and includes unspent oxidant gas and combustion products such as carbon dioxide and water. In the heat recovery unit 104, water from the water supply is heated to produce steam while the fuel is heated to a temperature suitable for the anode section, which is typically about 900-1000 degrees F. The steam and heated fuel are then provided to the anode section 102A of the fuel cell power plant. When the fuel cell power plant 102 is an internal reforming fuel cell power plant, the fuel and steam are internally reformed within the fuel cell to produce hydrogen for the fuel cell. When the fuel cell power plant 102 is an externally reforming fuel cell power plant, the fuel and steam are first conveyed to one or more reforming units (not shown) of the fuel cell power plant where the fuel and steam are reformed to produce hydrogen for the fuel cell.

The heat recovery unit 104 also functions as a heat exchanger for compressed oxidant gas being supplied to the system. As shown in FIG. 1, oxidant gas, such as air, is supplied to the compressor section 103A of the turbine 103 where the oxidant gas is pressurized or compressed and then conveyed to the heat recovery unit 104. In the heat recovery unit, the compressed oxidant gas is heated to about 1000-1100 degrees F. and is thereafter conveyed to a further heat exchanger 106 for further heating to about 1500-1600 degrees F. As shown in FIG. 1, the heated compressed oxidant gas is thereafter conveyed to the expansion section 103B of the turbine 103 where it is expanded to a lower pressure. When the oxidant gas is expanded in the expansion section 103B, mechanical power is applied to the rotor of the induction machine 105 and the mechanical power is then converted by the induction machine 105 to electrical power. As discussed above, when the rotor is driven at a speed higher than the rated synchronous speed for the induction machine, or the grid synchronous operating speed, the slip becomes negative and the induction machine generates electrical power and outputs power to the grid. As more mechanical power is applied to the rotor by the gas expansion process, more electrical power is generated by the induction machine at the grid frequency.

After expansion in the expansion section 103B, the oxidant gas is conveyed to an oxidizer 107 which also receives anode exhaust gas from the anode section 102A of the fuel cell power plant 102. In the oxidizer 107, the anode exhaust is catalytically oxidized, or combusted, using the oxidant gas and resultant oxidant gas output from the oxidizer is then provided for use in the cathode section 102B of the fuel cell power plant. As shown, the oxidant gas output from the oxidizer may be cooled in the heat exchanger 106 prior to being conveyed to the cathode section 102B, while heating the expanded oxidant gas output from the expansion section 103B. In certain embodiments, the heat exchanger 106 may receive anode exhaust so that the heat from the anode exhaust is conveyed to the compressed oxidant gas.

As mentioned herein above, the induction machine 105 can operate as a motor or as a generator. When the induction machine 105 operates as a motor, the rotor of the induction machine 105 is driven using power drawn from the grid to which the induction machine is connected and/or by the heated gas expanded by the expansion section of the turbine. The induction machine 105 is connected to the grid via a generator output breaker 105a which allows the machine 105 to draw power from the grid when closed and disconnects the machine from the grid when open. The opening and closing of the generator output breaker 105a is controlled by a controller 115 based on the speed of the rotor of the induction machine, the amount of heat produced by the fuel cell, and/or other factors. In particular, the controller 115 controls at least the induction machine 105 and the generator output breaker 105a during the start-up or heat up operation of the fuel cell power plant, as described in more detail below, and during normal operation and shut down operation of the fuel cell power plant. In the present illustrative embodiment, the controller 115 also controls other components of the system 100 and functions as a central system controller. However, in other embodiments, the controller 115 may be separate from other controller(s) for controlling other system components, or may be separate from a central system controller.

Since the induction machine is able to operate as a motor during the heat up of the fuel cell, the need for a separate turbine starting motor and a reduction gear, typically required for a synchronous generator in conventional systems, is eliminated. The heat up operation of the system 100 is described below with reference to FIG. 2.

Figure 2:
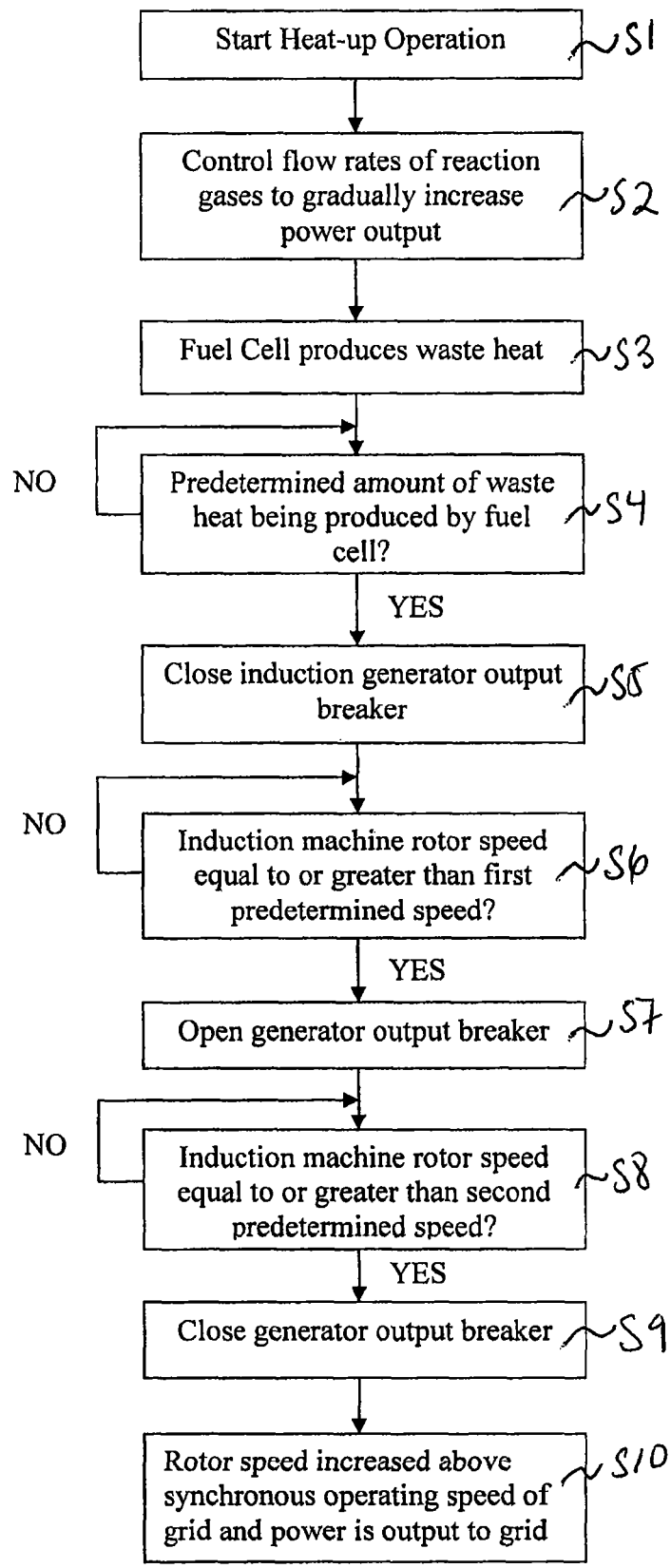
FIG. 2 shows a flow chart of a heat up operation of the system of FIG. 1.

During the heat up operation, the system 100 and, in particular the fuel cell power plant 102, is supplied with fuel and oxidant gases, which undergo a reaction in the fuel cells of the plant to produce electrical output. As shown in FIG. 2, after the heat up operation is started in step S1, flow rates of the fuel and oxidant gases are controlled in step S2 so that the power output from the fuel cell power plant and the temperature in the fuel cell power plant are increased gradually, e.g. usually at 5 kW per minute. In some embodiments, the flow rates of the reaction gases are controlled by the controller 115, while in other embodiments, the flow rates are controlled by another controller, such as a separate controller for the fuel cell power plant.

During the heat up operation, the fuel cell power plant starts to produce waste heat in step S3, which is output with the anode and cathode exhaust gases. As discussed above, the cathode exhaust is used in the heat recovery unit 104 to heat the oxidant gas compressed by the compressor section 103A of the turbine. In order to operate the turbine, the compressed gas has to be heated to a predetermined temperature, thus requiring sufficient waste heat from the fuel cell power plant.

In step S4, it is determined whether the fuel cell power plant 102 is producing sufficient waste heat for the operation of the turbine 103. This determination may be made by monitoring the temperature of the heated compressed gas output from the heat recovery unit 104 and/or of the further heated compressed gas further heated in the heat exchanger 106. The controller, such as the controller 115 or another controller, determines, based on the temperature of the heated compressed gas and/or the further heated compressed gas, whether or not the fuel cell power plant is producing sufficient heat for turbine operation.

When it is determined in step S4 that the fuel cell power plant has produced sufficient waste heat to operate the turbine 103, the generator output breaker 105a is controlled to be closed in step S5 by the controller 115, so as to cause the induction machine to draw power from the grid for operation as a motor and to increase the speed of the induction machine. In step S6, the speed of the induction machine's rotor is monitored to determine whether the rotor speed is equal to or greater than a first predetermined speed. The speed of the induction machine rotor may be monitored using a meter or another suitable device, which provides signals to the controller, such as the controller 115 or another controller, for determining whether or not the speed has reached the first predetermined speed. When it is determined that the speed of the induction machine's rotor driven by the turbine reaches the first predetermined speed, the controller controls the generator output breaker 105a to open in step S7 so as to allow the turbine speed to be sustained by the fuel cell exhaust. In this state when the generator output breaker is opened, the induction machine does not draw power from the grid and instead, the turbine drives the induction machine using waste heat from the fuel cell. The first predetermined speed is lower than the grid synchronous operating speed and is determined based on the available waste heat during the heatup of the fuel cell power plant so that the turbine speed is sustained by the fuel cell exhaust gas flow rather than electrical power. In selecting the first predetermined speed, it is important to note that it is usually not desirable to motor the turbine at near synchronous operating speed because a large amount of electrical power would be consumed unnecessarily. Accordingly, the first predetermined speed is generally lower than the near synchronous operating speed. In this illustrative embodiment, the first predetermined speed is about 50% of the grid synchronous operating speed, or the rated synchronous speed, of the induction machine. As the heat up of the fuel cell power plant progresses, the turbine inlet temperature increases, also increasing the turbine speed and thus, the speed at which the induction machine rotor is driven.

The speed of the induction machine rotor is monitored and in step S8, the controller, such as the controller 115 or another controller, determines whether or not the induction machine speed has reached a second predetermined speed, which is greater than the first predetermined speed and lower than the grid synchronous operating speed. As in step S6, the speed of the induction machine rotor may be monitored in step S8 using a meter or another suitable device, which then provides signals to the controller for determining whether or not the speed has reached the second predetermined speed. When it is determined in step S8 that the induction machine speed has reached the second predetermined speed, the controller 115 controls the generator output breaker 105 to close in step S9, thereby causing the induction machine to operate as a motor at a speed below the synchronous speed while connected to the electrical grid. In this illustrative embodiment, the second predetermined speed is slightly below the grid synchronous operating speed, or about 95% of the grid synchronous operating speed. For example, when the grid frequency is 60 Hz, the second predetermined speed of the induction machine is slightly below 1800 rpm due to the induction machine's motor slip.

As the fuel cell power plant heats up further and the exhaust temperature of the fuel cell power plant continues to increase, the turbine speed also increases so as to push the speed of the rotor slightly above the synchronous speed of the grid. When the speed of the rotor of the induction machine is increased above the synchronous operating speed of the grid in step S10, the induction machine 105 begins to operate as a generator and provides power to the grid, instead of drawing power from the grid. Typically, after the heat-up operation is completed and the fuel cell power plant is in normal operation mode, the speed of the induction machine rotor is above the synchronous operating speed of the grid, so that both the fuel cell power plant and the induction machine are outputting electrical power to the grid.

The operation of the induction machine as a generator does not require or use any speed controls for the turbine 103. Moreover, the induction machine does not require or use any electrical synchronization equipment because the turbine is synchronized with the grid inherently when the generator output breaker is closed. As a result, the use of an induction machine as the induction generator as well as the motor during the heat up operation, results in a less complex configuration of the hybrid system, lower manufacturing and operating costs, higher efficiency, smaller footprint and higher reliability than conventional configurations.

Figure 4:
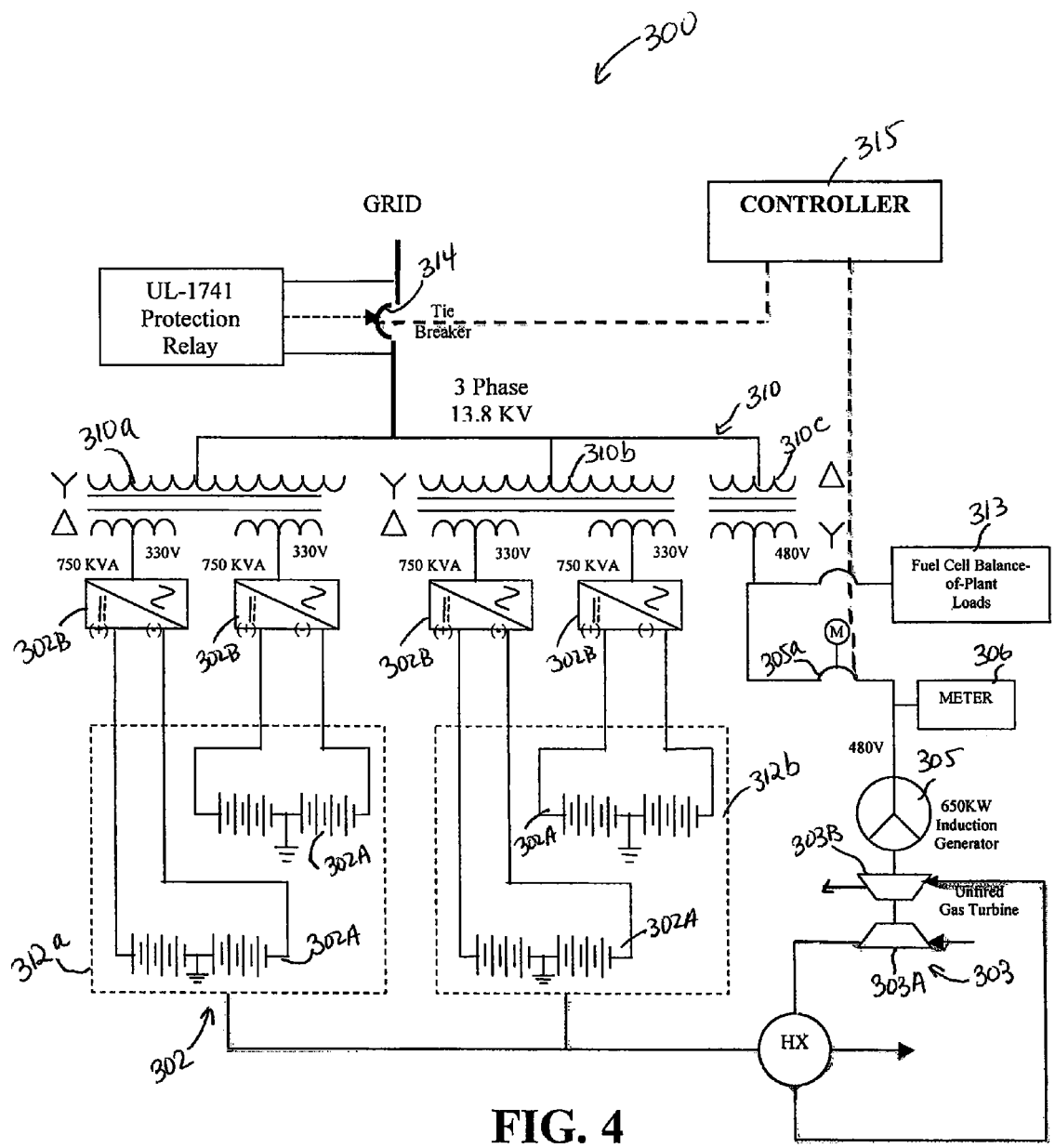
FIG. 4 shows an on-line diagram of the hybrid fuel cell power plant system of FIG. 1.

FIG. 4 shows an on-line diagram of the hybrid fuel cell power plant system 300. The system 300 may have a configuration similar to the configuration of the system 100 in FIG. 1 and in this embodiment, is a MW-scale hybrid power plant system. In the illustrative embodiment of FIG. 4, the hybrid fuel cell power plant system is a 3.6 MW plant, such as a DFC/T-3000 power plant system. The system of FIG. 4 includes a fuel cell power plant 302, a gas turbine 303, such as an unfired gas turbine, and an induction machine 305 coupled with the gas turbine 303. In this illustrative embodiment, the configurations of the fuel cell power plant 302, the gas turbine 303 and the induction machine 305 used in FIG. 4 are the same as or similar to those of the system 100 of FIG. 1. That is, in this embodiment, a compression section 303A of the turbine 303 compresses air or oxidant, the compressed air or oxidant gas is heated using fuel cell cathode exhaust and/or oxidizer exhaust derived from anode exhaust and an expansion section 303B of the turbine 303 expands the heated compressed air to a lower pressure, producing mechanical power which is then converted to electrical power by the induction machine 305. In other embodiments, however, the configuration of the fuel cell power plant, the turbine and the induction machine may be different. For example, in some embodiments, the compression section of the turbine compresses air or oxidant gas, the compressed air or oxidant gas is then supplied to the anode exhaust oxidizer where it is oxidized with compressed anode exhaust to produce a compressed and heated oxidant gas, which is then expanded in the expansion section of the turbine to a lower pressure, producing mechanical power converted to electrical power by the induction machine. For example, U.S. Pat. No. 7,862,938 assigned to the same assignee herein and the disclosure of which is incorporated herein by reference, shows an illustrative arrangement of the turbine, an anode oxidizer and the fuel cell. In yet other embodiments, the compression section may compress the oxidant gas before it is inputted into the fuel cell cathode and fuel cell exhaust output at an elevated pressure from the fuel cell is expanded in the expansion section driving the rotor of the induction machine which operates as discussed above.

As shown in FIG. 4, the fuel cell power plant 302 includes four like fuel cell stacks 302A, with each fuel cell stack 302A outputting DC power to a fuel cell inverter 302B which converts the DC power output of the stack to AC power, and produces 750 kVA of electrical power at a voltage of 330V. In some embodiments, the fuel cell stacks 302 may be arranged in pairs so that two fuel cell stacks are housed within a common enclosure, while in other embodiments the fuel cell stacks may be individually housed or may all be housed within the same enclosure. In the embodiment shown in FIG. 4, the four fuel cell stacks 302A are arranged in pairs and include a first fuel cell stack pair 312a and a second fuel cell stack pair 312b. Moreover, another exemplary arrangement of the fuel cell stacks within a fuel cell power plant is described in the commonly owned application Ser. No. 12/996,437, the entire description of which is incorporated herein by reference.

As shown, in the present embodiment, the gas turbine 303 is an unfired gas turbine driving the induction machine 305, which is a 650 KW induction machine. As described herein above, the gas turbine includes a compression section 303A for compressing the gas and an expansion section 303B for expanding compressed gas to generate mechanical energy, thereby driving the rotor of the induction machine 305. When the induction machine 305 of the present embodiment is operated as a motor, the induction machine draws electric power from the grid via a transformer 310 and/or is driven by the heat from the fuel cell exhaust gas. When the induction machine 305 is operated as an induction generator, the induction machine produces and outputs electric power at a voltage of 480V. A meter 306 may be used for measuring the power output or consumption of power by the induction machine. Additional instrumentation may be used for measuring the rotor speed of the induction machine. The operation of the induction machine as a motor and as a generator is controlled by a controller 315, similar to the controller 115 of FIG. 1. The controller 315 also controls the closing and opening of a generator output breaker 305a so as to connect or disconnect the induction machine from the grid. During the heat up of the hybrid fuel cell power plant, the controller 315 controls the opening and closing of the generator output breaker 305a, so that the induction machine, operating as a motor, draws power from the grid when the generator output breaker 305a is closed and is driven by the fuel cell exhaust gas when the generator output breaker 305a is open. As described above, during the heat up operation, the controller 315 controls the breaker 305a to close when the fuel cell power plant has produced sufficient waste heat to operate the turbine so that the induction machine 305 draws power from the grid and the speed of the rotor is increased to the first predetermined speed, which is about 50% of the grid synchronous operating speed. After the speed of the rotor is increased to the first predetermined speed, the controller 315 controls the breaker 305a to open so that the rotor speed is sustained by the fuel cell exhaust flow, and after the rotor speed reaches the second predetermined speed, which is about 95% of the grid synchronous operating speed, the controller 315 controls the breaker 305a to close so that the rotor speed further increases. In this way, as the outlet temperature of the fuel cell power plant 302 continues to increase, the speed of the rotor is pushed above the grid synchronous operating speed and the induction machine 305 begins to produce power, which is output to the grid.

The hybrid fuel cell power plant system 300 further includes fuel cell balance of plant 313, which comprises supporting and/or auxiliary components and equipment of the power plant. In the illustrative embodiment shown in FIG. 4, the induction machine 305 supplies electric power to the fuel cell balance of plant 313 components. In some embodiments, the balance of plant 313 components also draw all or some of the required power from the grid and/or are supplied with power produced by the fuel cell stack(s) 302a.

As shown in FIG. 4, the fuel cell stacks 302a and the induction machine 305 are connected to the grid via three-phase 13.8 KV transformers 310a-c. In particular, wherein the first pair of the fuel cell stacks 312a is connected to the grid via the first transformer 310a, the second pair of the fuel cell stacks 312b is connected to the grid via the second transformer 310b and the induction machine 305 is connected to the grid via the third transformer 310c. In the illustrative embodiment of FIG. 3, the balance of plant 313 is also connected with the grid via the third transformer 310c so that the balance of plant 313 components are able to draw electric power from the grid during the heat-up or start-up operation of the hybrid fuel cell plant and/or when the amount of electric power produced by the induction machine 305 is not sufficient to satisfy the load of the balance of plant 313. It is understood that the transformer configuration is not limited to the configuration shown in FIG. 4 and that other transformer configurations may be used in the hybrid fuel cell power plant, such as different input and output voltages or different winding arrangements (e.g., delta or wye).

As further shown in FIG. 4, the transformer 310 is coupled to the grid via a tie breaker or overload protection relay 314 in conformance with UL-1741 standards. When the tie breaker 314 is closed, the hybrid fuel cell power plant system is connected to the grid and supplies electric power to the grid. When the tie breaker 314 is open, the hybrid fuel cell power plant system 300 is disconnected from the grid. The opening and closing of the tie breaker 314 is controlled by the controller 315 in accordance with predetermined conditions. For example, the controller 315 controls the tie breaker 314 to be closed during the heat up or start up of the fuel cell power plant 302 so as to supply power to the fuel cell system's balance-of-plant loads and during normal operation of the fuel cell power plant 302 so that the power plant supplies power to the grid. In addition, the controller 315 controls the tie breaker 314 to open if the controller 315 detects that the grid experiences abnormal voltage, frequency or current.

Although in the present illustrative embodiment, the same controller 315 controls the generator output breaker 305a and the tie breaker 314, in other embodiments, different controllers may be used for controlling the generator output breaker 305a and the tie breaker 314. In addition, in some embodiments, the controller 315 may be part of a central controller for controlling the operation of hybrid fuel cell power plant.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

We claim:

1. A hybrid fuel cell system comprising:
   a high temperature fuel cell having an anode section and a cathode section;
   a gas turbine comprising a compressor cycle for compressing a supply gas and an expansion cycle for expanding at least one of heated compressed supply gas and a second gas derived from the compressed supply gas to provide mechanical energy to an induction machine;

the induction machine for converting mechanical energy to electrical energy and adapted to output an electrical output and to connect to an electrical grid; and a controller programmed to control connecting and disconnecting of the induction machine to and from the electrical grid based on at least a speed of a rotor of the induction machine and an amount of heat produced by the high temperature fuel cell.

2. A hybrid fuel cell system in accordance with claim 1, wherein the induction machine is adapted to be connected to an electrical grid without synchronizing equipment and wherein the system does not include speed controls for the gas turbine.

3. A hybrid fuel cell system in accordance with claim 1, wherein the gas turbine is an unfired gas turbine and the supply gas comprises one of air and oxidant gas.

4. A hybrid fuel cell system in accordance with claim 1, wherein the induction machine is a three-phase 4-pole induction machine having a predetermined size to match the gas turbine.

5. A hybrid fuel cell system in accordance with claim 4, wherein the high temperature fuel cell is a mega-Watt scale fuel cell power plant and the predetermined size of the induction machine is at least 300 kW.

6. A hybrid fuel cell system in accordance with claim 5, wherein one of:
(a) the high temperature fuel cell comprises a 1.8 MW fuel cell power plant and the predetermined size of the induction machine is 325 kW; and
(b) the high temperature fuel cell comprises a 3.2 MW fuel cell power plant and the predetermined size of the induction machine is 650 kW.

7. A hybrid fuel cell system in accordance with claim 1, wherein the induction machine operates as an induction motor during a heat-up operation of the high temperature fuel cell and operates as an induction generator during a normal operation of the high temperature fuel cell.

8. A hybrid fuel cell system in accordance with claim 7, further comprising balance of plant components, wherein the induction machine provides electrical output to the balance of plant components when the induction machine operates as the induction generator.

9. A hybrid fuel cell system in accordance with claim 1, wherein the system further comprises:
a generator output breaker for connecting and disconnecting the induction machine from the electrical grid; and
the controller controls opening and closing of the generator output breaker.

10. A hybrid fuel cell system in accordance with claim 9, wherein:
(a) during a heat-up operation of the high temperature fuel cell, the controller controls the generator output breaker to close if the high temperature fuel cell produces a predetermined amount of waste heat and the speed of the rotor of the induction machine is less than a first predetermined speed, the controller controls the generator output breaker to open if the high temperature fuel cell produces at least the predetermined amount of waste heat and the speed of the rotor is greater than or equal to the first predetermined speed and less than a second predetermined speed, and the controller controls the generator output breaker to close if the speed of the rotor is greater than the second predetermined speed, the second predetermined speed being greater than the first predetermined speed; and (b) during normal operation of the high temperature fuel cell, the controller controls the generator output breaker to close.

11. A hybrid fuel cell system in accordance with claim 10, wherein the predetermined amount of waste heat is sufficient for operating the gas turbine, the first predetermined speed is 50% of a grid synchronous operating speed of the induction machine and the second predetermined speed is 95% of the grid synchronous operating speed of the induction machine.

12. A hybrid fuel cell system in accordance with claim 1, wherein:
the high temperature fuel cell is adapted to connect to an electrical grid and comprises a plurality of fuel cell stacks; and
the system comprises at least one transformer for connecting the high temperature fuel cell and the induction machine to the electrical grid.

13. A hybrid fuel cell system in accordance with claim 12, wherein the transformer comprises a three-phase transformer for connecting the high temperature fuel cell and the induction machine to the electrical grid, and the system further comprises:
a breaker for connecting the three-phase transformer to the electrical grid and for disconnecting the three-phase transformer from the electrical grid,
wherein the controller controls the opening and closing of the breaker.

14. A hybrid fuel cell system in accordance with claim 1, wherein:
the compressor cycle of the gas turbine compresses the supply gas comprising one or more of oxidant gas and air and outputs compressed supply gas;
the system further comprises at least one heat recovery unit for recovering heat from at least one of cathode exhaust and anode exhaust and for heating the compressed supply gas; and
the expansion cycle expands the heated compressed supply gas and provides mechanical energy to the induction machine.

15. The hybrid fuel cell system in accordance with claim 14, further comprising an oxidizer adapted to receive anode exhaust and expanded supply gas output from the expansion cycle, and to catalytically oxidize the anode exhaust with the expanded supply gas so as to output heated oxidant gas, wherein the compressed supply gas is heated using cathode exhaust in the heat recovery unit and further heated using the heated oxidant gas output from the oxidizer.

16. A hybrid fuel cell system in accordance with claim 1, wherein:
the compressor cycle of the gas turbine compresses the supply gas comprising one or more of oxidant gas and air, and outputs compressed supply gas;
the system further comprises an oxidizer adapted to receive anode exhaust from the high temperature fuel cell and the compressed supply gas and to output the second gas comprising heated compressed oxidant gas; and
the expansion cycle expands the second gas, provides mechanical energy to the induction machine and outputs expanded oxidant gas to the cathode section of the high temperature fuel cell.

17. A hybrid fuel cell system in accordance with claim 16, further comprising at least one heat recovery unit for recovering heat from at least one of cathode exhaust and anode exhaust and further heating the second gas prior to expanding the second gas in the expansion cycle.

18. A method for use with a hybrid fuel cell system comprising a high temperature fuel cell having an anode section and a cathode section, a gas turbine comprising a compressor cycle and an expansion cycle and an induction machine, the method comprising:

provinding a supply gas to the gas turbine;

compressing the supply gas in the compressor cycle of the gas turbine;

generating one of heated compressed supply gas and a second gas derived from the compressed supply gas using waste heat from the high temperature fuel cell;

expanding the one of the heated compressed supply gas and the second gas in the expansion cycle of the gas turbine to provide mechanical energy to the induction machine;

converting mechanical energy to electrical energy using the induction machine, wherein the induction machine is adapted to connect to an electrical grid; and controlling connecting and disconnecting of the induction machine to and from the electrical grid based on at least a speed of a rotor of the induction machine and an amount of heat produced by the high temperature fuel cell.

19. A method in accordance with claim 18, further comprising outputting electrical energy from the induction machine to an electrical grid without using synchronizing equipment, and wherein the hybrid fuel cell system does not include speed controls for the gas turbine.

20. A method in accordance with claim 18, wherein:
the gas turbine is an unfired gas turbine;
the step of providing the supply gas comprises providing at least one of air and oxidant gas; and
said method further comprises providing fuel and oxidant gases to the high temperature fuel cell, wherein the oxidant gas provided to the high temperature fuel cell comprises one gas turbine exhaust and a third gas derived from gas turbine exhaust.

21. A method in accordance with claim 18, wherein the induction machine operates as an induction motor during a heat-up operation of the high temperature fuel cell, and operates as an induction generator during a normal operation of the high temperature fuel cell, and the hybrid fuel cell system comprises balance of plant components, the method further comprising:

outputting electrical power from the induction machine during the normal operation of the high temperature fuel cell and providing at least a portion of the electrical power to balance of plant components.

22. A method in accordance with claim 18, wherein the induction machine is adapted to connect to the electrical grid using a generator output breaker and wherein the step of controlling comprises controlling opening and closing of the generator output breaker based on at least one of the speed of the rotor of the induction machine and the amount of heat produced by the high temperature fuel cell.

23. A method in accordance with claim 22, wherein controlling the opening and closing of the generator output breaker comprises at least one of:

(a) during a heat-up operation of the high temperature fuel cell, controlling the generator output breaker to close if the high temperature fuel cell produces a predetermined amount of waste heat and the speed of the rotor of the induction machine is less than a first predetermined speed, controlling the generator output breaker to open if the high temperature fuel cell produces at least the predetermined amount of waste heat and the speed of the rotor is greater than or equal to the first predetermined speed and less than a second predetermined speed, and controlling the generator output breaker to close if the speed of the rotor is greater than the second predetermined speed, the second predetermined speed being greater than the first predetermined speed; and (b) during normal operation of the high temperature fuel cell, controlling the generator output breaker to close during the normal operation of the high temperature fuel cell.

24. A method in accordance with claim 23, wherein the predetermined amount of waste heat is sufficient for operating the gas turbine, the first predetermined speed is 50% of a grid synchronous operating speed of the induction machine and the second predetermined speed is 95% of the grid synchronous operating speed of the induction machine.

25. A method in accordance with claim 18, further comprising:

catalytically oxidizing anode exhaust and expanded supply gas output from the gas turbine to produce heated oxidant gas, wherein:
the supply gas comprises one of air and oxidant gas, and
the step of generating comprises heating the compressed supply gas using heat from at least one of anode exhaust and cathode exhaust in a heat recovery unit, and further heating the compressed supply gas using the heated oxidant gas output from the oxidizer.

26. A method in accordance with claim 18, wherein:
the supply gas comprises one of oxidant gas and air;
the step of generating comprises catalytically oxidizing anode exhaust and compressed supply gas to generate the second gas derived from the compressed supply gas and comprising heated compressed oxidant gas; and
the step of expanding comprises expanding the second gas to provide mechanical energy to the induction machine and to provide expanded second gas for use in the cathode section of the high temperature fuel cell.

27. A hybrid fuel cell system comprising:
a high temperature fuel cell having an anode section and a cathode section;
a gas turbine comprising a compressor cycle for compressing a supply gas and an expansion cycle for expanding at least one of heated compressed supply gas and a second gas derived from the compressed supply gas to provide mechanical energy to an induction machine;
the induction machine for converting mechanical energy to electrical energy and adapted to output an electrical output and to connect to an electrical grid; and
a controller programmed to control connecting and disconnecting of the induction machine to and from the electrical grid based on one or more of: one or more predetermined conditions of the hybrid fuel cell system, and one or more predetermined conditions of the electrical grid.

* * * * *